Figure 1:
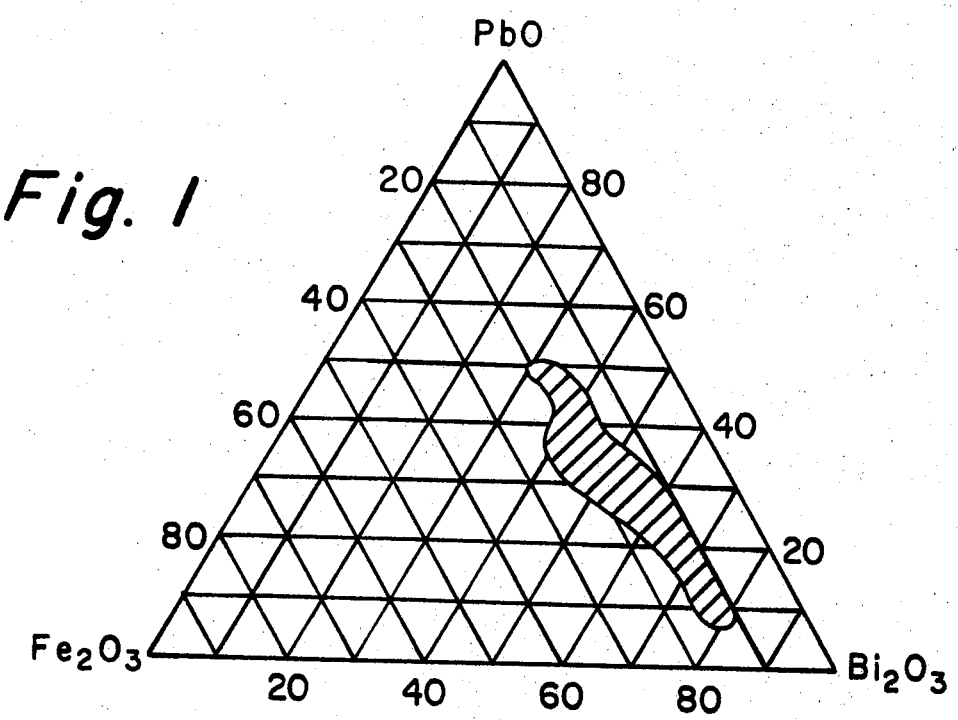

United States Patent [19]
Berleue et al.

[11] 3,837,868
[45] Sept. 24, 1974

[54] STABILIZED BISMUTHATE GLASSES

[75] Inventors: Albert J. Berleue, Bradford; William H. Dumbaugh, Jr., Painted Post, both of N.Y.

[73] Assignee: Corning Glass Works, Corning, N.Y.

[22] Filed: Mar. 26, 1973

[21] Appl. No.: 345,083

[52] U.S. Cl................................................ 106/47 R
[51] Int. Cl......... C03c 3/12, C03c 3/24, C03c 3/30
[58] Field of Search........................ 106/47 R, 47 Q

[56] References Cited
UNITED STATES PATENTS
3,723,141   3/1973   Dumbaugh, Jr.................. 106/47 R

*Primary Examiner*—Winston A. Douglas
*Assistant Examiner*—Mark Bell
*Attorney, Agent, or Firm*—Clinton S. Janes, Jr.; Clarence R. Patty, Jr.

[57] ABSTRACT

Iron oxide is used to stabilize infrared transmitting, lead and cadmium bismuthate glasses. The resulting glasses contain, in cation percent, 8 to 80% $Bi_2O_3$, 0–57% PbO, 0–32% CdO, at least 5% Pbo + CdO, 5–32.5% $Fe_2O_3$, and 0–15% miscellaneous other oxides.

8 Claims, 8 Drawing Figures

STABILIZED BISMUTHATE GLASSES

The invention relates to lead and cadmium bismuthate glasses that are adapted to production of windows for infrared detection systems because of exceptionally good infrared transmission characteristics, especially at wavelengths beyond 6 microns. It is particularly concerned with a method of stabilizing such glasses without seriously impairing their infrared transmitting characteristics.

Detection systems based on sensitivity to infrared or heat radiation are well known. The detection device in such a system normally embodies an opening which is closed by an infrared transmitting glass in the form of a flat window or hollow dome depending on the device construction. Such closures are presently produced from special silicate or germanate glasses. However, these glasses, in practical thicknesses, have a characteristic transmission cutoff in the range of 4.5 to 5.5 microns and do not transmit radiation longer than 6 microns in wavelength.

Chalcogenide glasses may have useful transmission characteristics at longer wavelengths. However, these glasses are quite susceptible to surface deterioration in use and normally must be insulated from the atmosphere during the melting process. Therefore, there is a distinct need for glasses that can be melted and handled in normal manner and that will also provide substantial transmission at wavelengths beyond 6 microns.

U.S. Pat. No. 3,531,304, granted to H. Bromer et al., on Sept. 29, 1970, discloses infrared transmitting glasses composed primarily of at least two oxides selected from the oxides of tungsten, molybdenum, bismuth, and arsenic, the balance being selected from the oxides and fluorides of Mg, Ca, Sr, Ba, and Pb. The patent shows that these glasses do not transmit to an appreciable extend beyond a wavelength of 6 microns, their cutoff being within the range of 5 to 6 microns.

Bismuthate-type glasses have previously been proposed for the production of optical elements wherein a high refractive index is of particular importance. Specifically, U.S. Pat. No. 2,853,393, granted Sept. 23, 1958 to Beck and Taylor, discloses high index, transparent optical elements containing (1) at least 75 percent by weight of at least two oxides of the group $Bi_2O_3$, PbO, $Tl_2O_3$, $WO_3$, $Ta_2O_5$, and CdO, (2) at least 40 percent $Bi_2O_3$ and/or PbO, and (3) 0 to 10% of strong glass forming oxides such as $SiO_2$ and $B_2O_3$. U.S. Pat. No. 2,870,030, granted Jan. 20, 1959, to Stradley and Beck, discloses similar glasses composed of 70–99% $Bi_2O_3$, 0–30% $TiO_2$, 0–15% ZnO, 0–20% alkaline earth oxides and 0–10% strong glass formers ($SiO_2$, $B_2O_3$ and/or $P_2O_5$). U.S. Pat. No. 2,726,161, granted Dec. 6, 1955 to Beck and Taylor, and No. 2,790,723, granted Apr. 30, 1957 to Stradley and Beck, relate to similar high index glass elements employing, respectively, bismuth titanate and lead titanate base glasses.

It has been learned that bismuthate-type glasses may exhibit substantial infrared transmission over a phenomenally long wavelength range extending up to nine microns. It is, however, difficult to produce such glasses. As noted in the prior art, bismuthate melts have a strong tendency to devitrify or crystallize on cooling so that the glassy state is not achieved. A strong glass forming oxide such as silica may be added to inhibit this tendency, and thereby stabilize the glass. However, even minor amounts of the strong glass forming oxides also tend to sharply restrict the infrared transmission. Thus, there is a problem of stabilizing a bismuthate-type glass without drastic loss of infrared transmission.

Copending application Ser. No. 126,798, filed Mar. 22, 1971 by one of us, now U.S. Pat. No. 3,723,141 granted Mar. 27, 1973, discloses stabilizing lead bismuthate glasses with a combination of barium and zinc oxides to produce infrared transmitting glasses. Such glasses have excellent transmission properties, but are not as well stabilized as would be desirable. Consequently, the glasses must be handled quickly, and in small quantities, to avoid devitrification. Accordingly, there remains the need for a better stabilized glass to enable production of glass articles of larger and more useful size.

It is the primary purpose of the present invention to meet this need. The invention is based on our discovery that a range of lead and cadmium bismuthate melts can be stabilized to produce glasses by including iron oxide ($Fe_2O_3$) in the composition as a stabilizing agent. It has further been found that this oxide does not adversely affect the excellent transmission imparted to the glasses by the lead, bismuth, and cadmium oxides.

The invention is an infrared transmitting glass which consists essentially, in cation percent on an oxide basis, of 8 to 80% $Bi_2O_3$, 0 to 57% PbO, 0 to 32% CdO, at least 5% PbO + CdO, 5 to 32.5% $Fe_2O_3$, and 0 to 15% of other compatible glass-making constituents. It further comprises a method of stabilizing a lead or cadmium bismuthate glass by including in the batch from which the glass is melted a compound of iron in an amount providing 5 to 32.5% $Fe_2O_3$ in the melt, said $Fe_2O_3$ being expressed in cation percent.

In the ternary system $Bi_2O_3$—PbO—$Fe_2O_3$, glasses have been produced within the composition ranges: 30 to 80% $Bi_2O_3$, 7 to to 50% PbO and 10 to 25% $Fe_2O_3$. These ranges are in terms of cation percent and roughly approximate the following ranges in weight percent: 40 to 89% $Bi_2O_3$, 8 to 58% PbO and 3 to 10% $Fe_2O_3$.

In the ternary system $Bi_2O_3$—CdO—$Fe_2O_3$, glasses have been produced within the composition ranges: 45 to 75% $Bi_2O_3$, 5 to 32% CdO and 12 to 30% $Fe_2O_3$. These ranges are also in terms of cation percent and roughly approximate the following ranges in weight percent: 63 to 84% $Bi_2O_3$, 3 to 22% CdO, and 4 to 12% $Fe_2O_3$.

The present glasses are based primariy on bismuth oxide ($Bi_2O_3$), and are therefore termed bismuthate glasses. Glass formation has been achieved over the range 8 to 80 cation percent $Bi_2O_3$, but a range of 20–60% is preferred for greater stability and hence more flexibility in glass working. This oxide is primarily responsive for the unusual infrared transmission characteristics of the present glasses.

Either lead oxide (PbO) or cadmium oxide (CdO) is required in conjunction with $Bi_2O_3$ for glass formation, and a substantial amount of each oxide is usually preferred. In the absence of CdO, at least 7 cation percent PbO is required, whereas glasses have been made with as little as 5 cation percent CdO alone. The glasses require at least 5 cation percent of PbO + CdO. In the absence of PbO, glasses generally cannot be produced with more than 32 cation percent CdO. Likewise, the PbO content should not exceed 50 percent in the absence of CdO, but, in combination, the two oxides may be present in amounts up to about 75 percent.

Lead and cadmium oxides usually function as glass modifying oxides, but their exact role in the present glasses is not certain. They have relatively good infrared transmission characteristics, and may be used at any level within the indicated ranges to form glasses having the desired good infrared transmission. Therefore, the relative amounts of $Bi_2O_3$, CdO, and PbO in any particular glass are selected on the basis of glass forming and other properties. The present glasses preferably contain at least 70 cation percent of these three oxides. Their total content should be as high as practical when infrared transmission is of primary interest.

The stabilizing oxide in the present glasses is iron oxide ($Fe_2O_3$). At least 5 cation percent of this oxide is required in a mixed PbO-CdO glass, while at least 10% $Fe_2O_3$ is required in a ternary glass containing CdO or PbO alone. Amounts greater than 32.5 percent are not compatible in the present glasses and the maximum permissible content in ternary glasses, i.e., PbO or CdO free glasses, is somewhat less.

Up to about 15 cation percent total of other compatible glassmaking oxides may be made to the base composition in individually limited amounts to modify secondary glass properties, such as expansion coefficient and viscosity characteristics, without unduly affecting infrared transmission. Thus, up to 7.5 cation percent of ZnO and/or BaO may be present while still producing glasses with the characteristic superior infrared transmission. Also, up to 5 cation percent of $GeO_2$, $V_2O_5$, NiO, CoO and other transition metal oxides may be present if desired.

As indicated earlier, the strong glass formers, $SiO_2$ and $B_2O_3$, are very effective in stabilizing the present glasses, but have a disastrous effect on infrared transmission. They may be present to give additional stability at the expense of transmission, but must not exceed about 2 cation percent.

Figure 2:
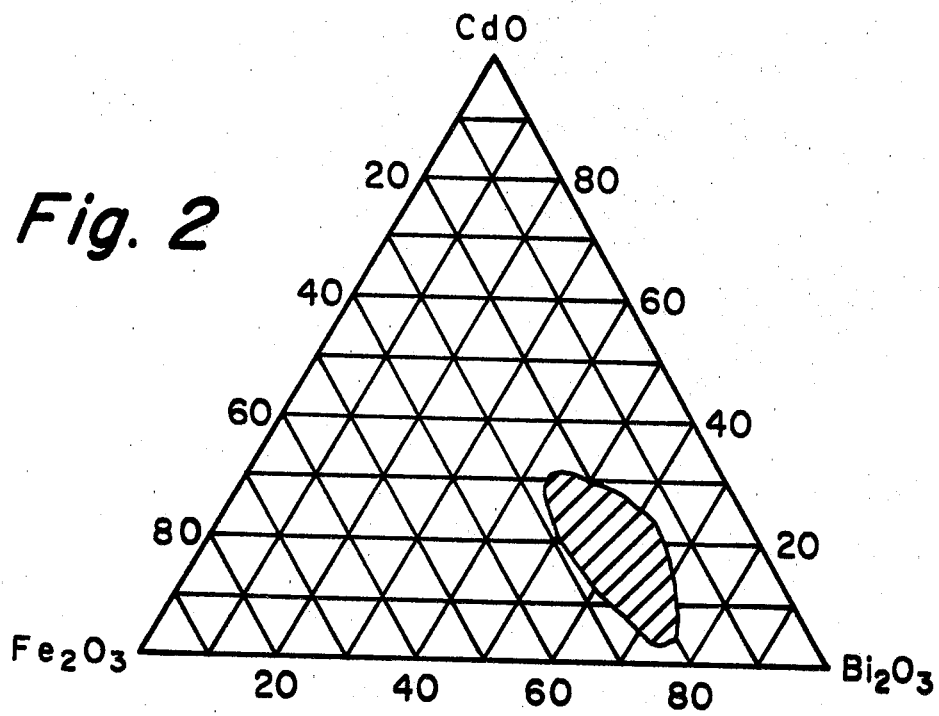
Figure 3:
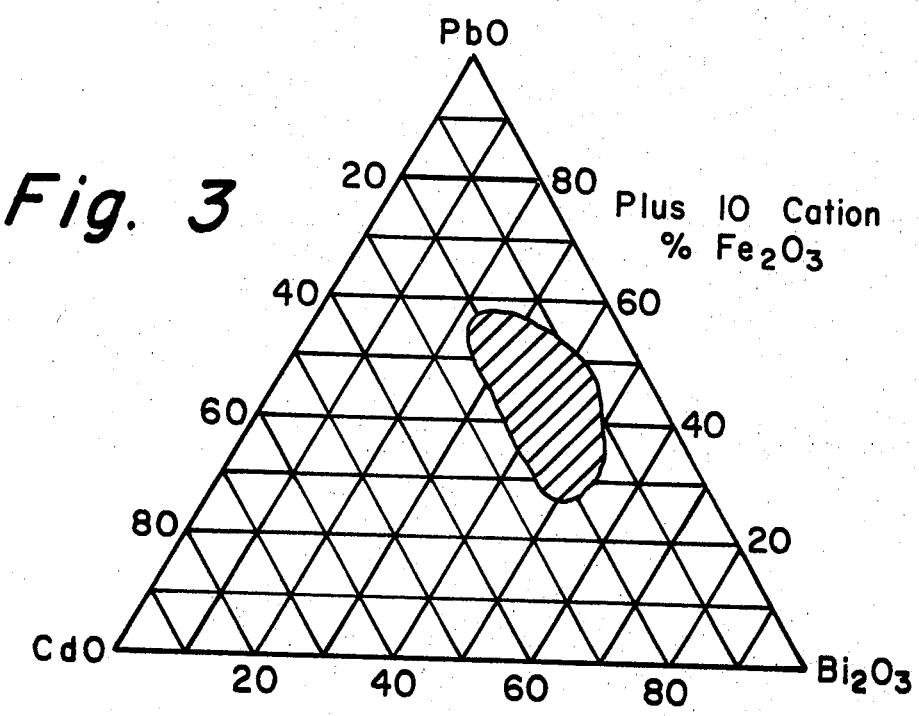
Figure 4:
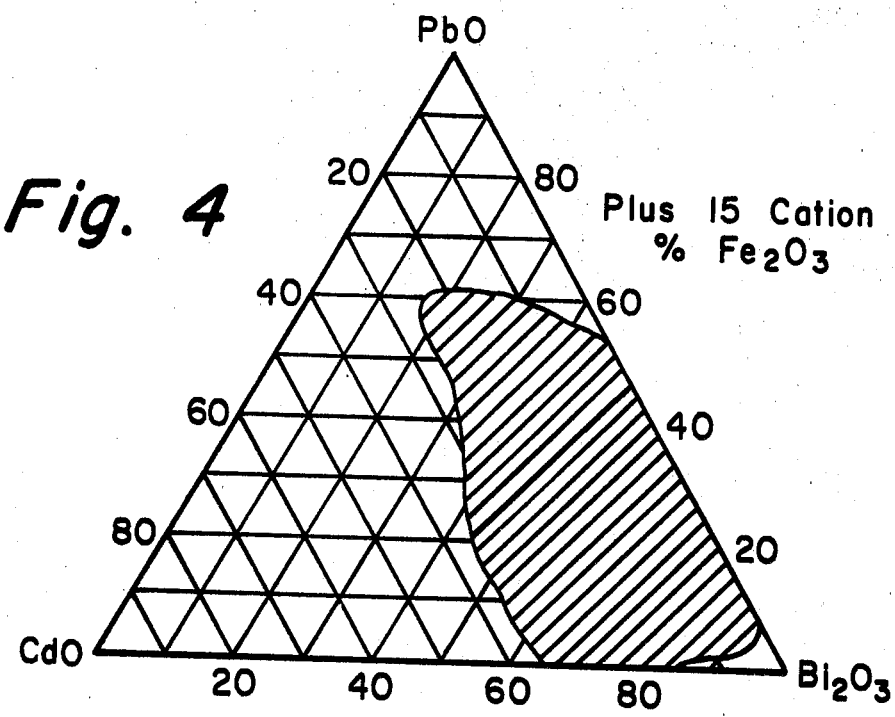
Figure 5:
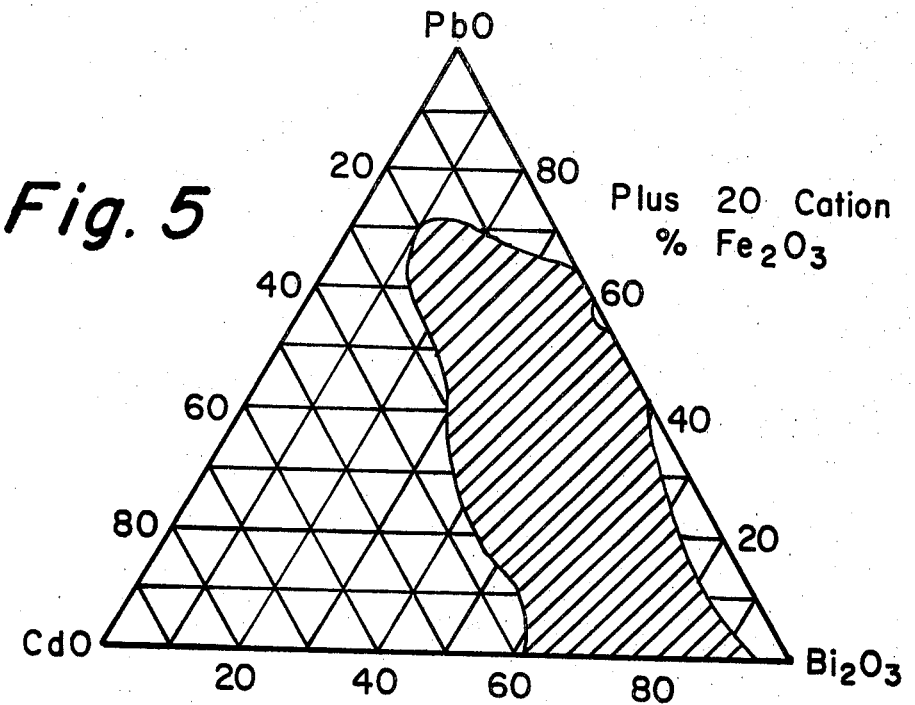
Figure 6:
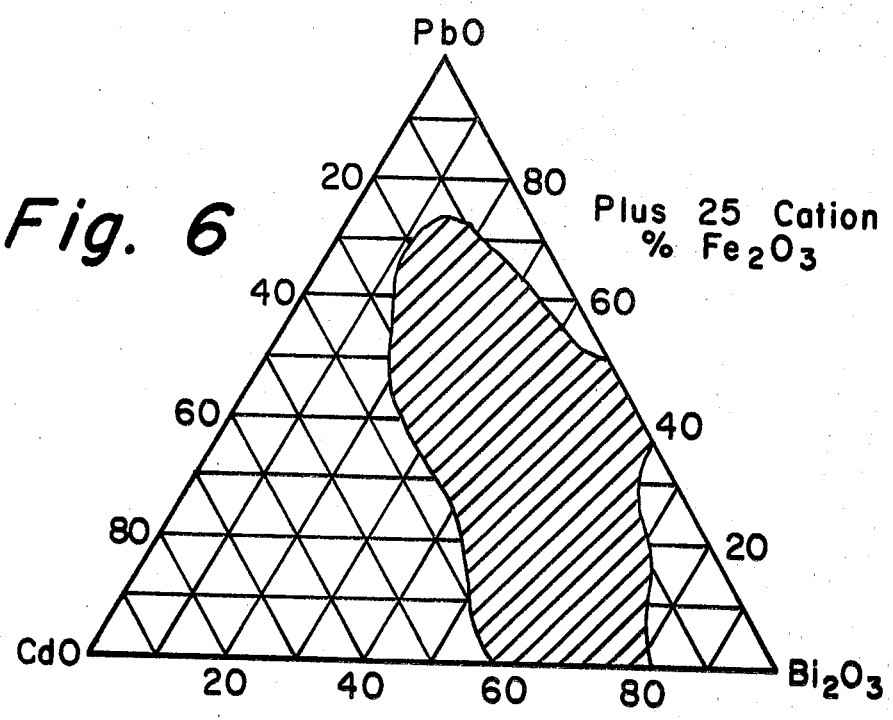
Figure 7:
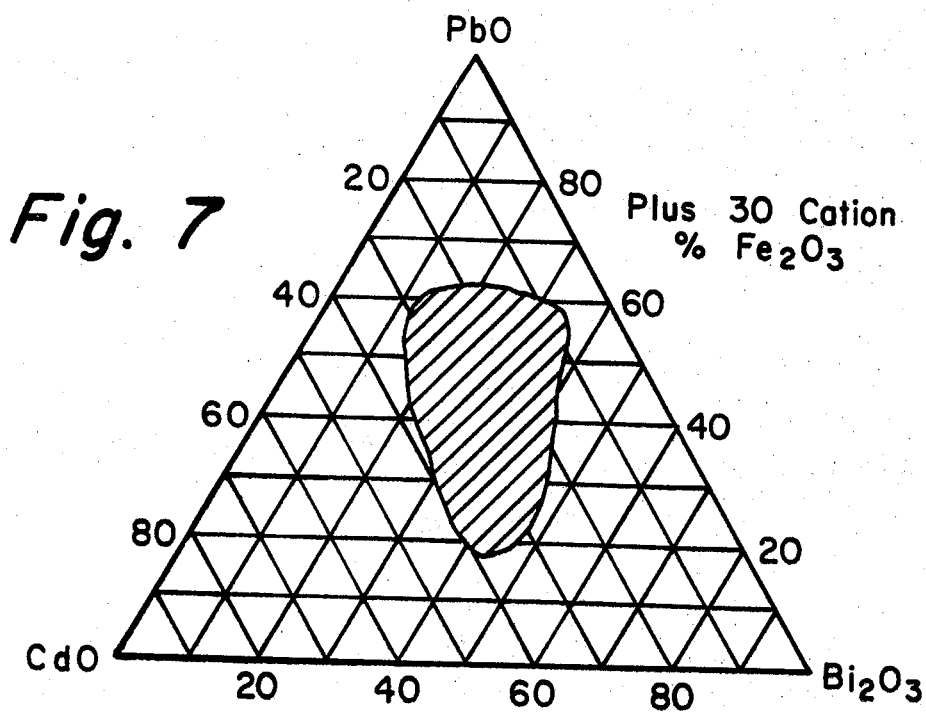
Figure 8:
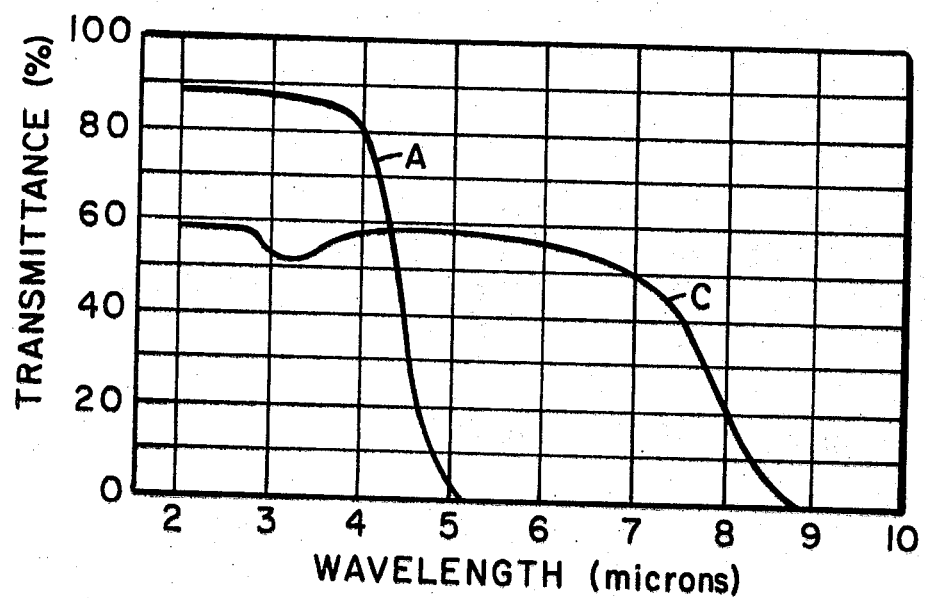

The invention is further illustrated in, and described with reference to, the accompanying drawings wherein, FIG. 1 is a ternary composition diagram illustrating the area of glass formation in the $Fe_2O_3$—PbO—$Bi_2O_3$ ternary system, FIG. 2 is a similar diagram illustrating the $Fe_2O_3$—CdO-$Bi_2O_3$ ternary system, FIGS. 3-7 are a series of ternary composition diagrams illustrating areas of glass formation at different $Fe_2O_3$ levels in the $Fe_2O_3$—CdO—PbO—$Bi_2O_3$ system, and FIG. 8 is a graphical illustration comparing the infrared transmission characteristics of a glass in accordance with the present invention and a prior commercial glass.

FIG. 1 is a ternary composition diagram, that is a triangular graphical illustration, wherein the left hand end of the base represents 100% $Fe_2O_3$, the right hand end represents 100% $Bi_2O_3$ and the peak or vertex of the triangle represents 100% PbO. The enclosed, lined area represents that portion of the $Fe_2O_3$—PbO—$Bi_2O_3$ ternary system in which glasses could be produced.

FIG. 2 corresponds to FIG. 1 except that CdO replaces PbO at the peak or vertex of the triangle. The enclosed, lined area in this graph represents that portion of the $Fe_2O_3$—CdO—$Bi_2O_3$ ternary system in which glasses could be produced.

FIGS. 3-7 are a series of composition diagrams in which the left hand end of the base line represents 100% CdO, the right hand represents 100% $Bi_2O_3$ and the peak or vertex represents 100% PbO. In each diagram, there is a fixed addition of $Fe_2O_3$ in each glass represented. For example, the glasses represented in FIG. 3 each contain an addition of 10 cation percent $Fe_2O_3$; those in FIG. 4 a 15 cation percent $Fe_2O_3$ addition; and those in FIG. 7 a 30 cation percent addition. The enclosed lined area in each FIGURE represents the area of glass formation in the CdO—PbO—$Bi_2O_3$—$Fe_2O_3$ system at the indicated fixed iron oxide content, with the summation of FIGS. 1-7 depicting, in combination, the $Fe_2O_3$—CdO—PbO—$Bi_2O_3$ system.

The glass forming region, as illustratively shown in FIGS. 1-7, was explored using a technique known as strip melting. In this technique, a glass batch is formulated and mixed in the usual manner. Approximately 5 grams of batch is placed in a depression formed in a strip of thin platinum foil. The platinum melting strip is mounted with an electrode fastened to either end. Then a variable, controlled source of electrical power is supplied to gradually heat the strip to a predetermined melting temperature. After the batch is completely melted, the temperature is maintained for about two minutes. Then the power is discontinued and a jet of cooling air directed against the bottom of the platinum strip directly beneath the melted batch to quench the melt.

By way of more specifically illustrating the systematic exploration of the glass forming area, reference is made to FIG. 1. A batch composed, on a cationic basis, of 40 parts lead oxide, 20 parts cadmium oxide, and 40 parts bismuth oxide was mixed and an addition of 10 parts ferric oxide made. Additional batches were formulated and mixed in which the iron and cadmium oxides were held constant and lead oxide and bismuth oxide substituted for one another over the range of 20-60 parts lead oxide and 60-20 parts bismuth oxide. A further series of batches at the 15 percent cadmium oxide level was formulated and mixed. A sample of each batch was then heated on the strip melter and chilled to determine whether glass formation took place. This method of systematic oxide substitution was used to determine the field of glass formation outlined in each of FIGS. 1-7.

Glass batches are normally formulated on a weight basis, and oxide compositions are then calculated therefrom on a weight percent basis. Nevertheless, it is frequently desirable to express compositions in terms of ions or moles in order to better demonstrate a relationship between a series of glass compositions and their properties. Further, substitutions between additives such as alkali metal oxides, radiation absorbers, and fining agents must often be made on an ionic or mole basis to avoid complications arising from the great disparity in atomic weights of the cationic elements. Mole percent is commonly used, but cation percent is preferable where cations of multiple valence are involved, e.g., iron, molybdenum, germanium, and tantalum.

Cation percent represents a relationship between the actual numbers of cations in a composition. Thus, a composition consisting, on a cation basis, of 40% lead oxide (PbO), 20% cadmium oxide (CdO) and 40% bismuth oxide ($Bi_2O_3$) will contain cations in the ratio of 4 lead: 2 cadmium: 4 bismuth. In turn, this corresponds to a ratio of 4 moles PbO: 2 moles CdO: 2 moles $Bi_2O_3$ (4 bismuth ions). It is then an arithmetic process to convert any given cation percent composition to weight percent.

The present glasses melt at temperatures in the range of 900°C. to 1,000°C. Melting in an electrically heated, platinum container has been found most satisfactory. Various salts and other compounds may be used as batch ingredients, but it is preferred to mix the glass batch from reagent grade oxides in the interest of purity and property control.

Because of their relatively unstable nature, the glasses are preferably chilled rapidly from the molten state. The glass may be cast in desired shape, ground and polished, or otherwise finished in known manner, depending on the form of article required.

Table I below sets forth, in cation percent on an oxide basis, batches for several glasses in accordance with the invention. It will be appreciated that, since the batches are composed of oxides, glasses melted therefrom have the same calculated composition, and approximately the same analyzed composition.

TABLE I

| | Cation % | | | | | |
|---|---|---|---|---|---|---|
| | 1 | 2 | 3 | 4 | 5 | 6 |
| PbO | 25 | 5 | 40 | 30 | 10 | — |
| $Bi_2O_3$ | 60 | 75 | 20 | 40 | 55 | 55 |
| CdO | — | 5 | 15 | 10 | 15 | 25 |
| $Fe_2O_3$ | 15 | 15 | 25 | 20 | 20 | 20 |

Reagent grade oxides were used in preparing the batches of Table I which were melted in platinum crucibles.

Table II shows the oxide compositions of Table I in weight percent, and also shows the annealing point (A.P.), the temperature of crystallization (C.T.) and the melting point or liquidus (M.P.) as determined in degrees Centigrade (°C.) from differential thermal analyses.

Table II

| | Weight % | | | | | |
|---|---|---|---|---|---|---|
| | 1 | 2 | 3 | 4 | 5 | 6 |
| PbO | 25.5 | 5.5 | 54.4 | 35.4 | 12.0 | — |
| $Bi_2O_3$ | 69.1 | 85.5 | 25.6 | 49.3 | 69.0 | 72.7 |
| CdO | — | 3.1 | 10.5 | 6.8 | 10.4 | 18.2 |
| $Fe_2O_3$ | 5.4 | 5.9 | 9.5 | 8.5 | 8.6 | 9.1 |
| A.P. | 315 | 330 | 322 | 310 | 350 | 370 |
| C.T. | 360 | 400 | — | 390 | 425 | 455 |
| M.P. | 590 | 620 | — | 610 | 615 | 630 |

Several of the compositions of Tables I and II were selected for further study. For each composition, a larger size batch was mixed and melted in a platinum container. Each melt was centrifugally cast to produce a dome shaped article having a two inch outside diameter, a height of 2½ inches and a wall thickness up to 2 millimeters. The infrared transmission of each glass was measured at several wavelengths on a Perkin Elmer model 221 recording spectrophotometer. The data thus observed are reported in Table III below. It will be appreciated that transmission values from these glasses should be quite similar, and that actual variations are, to a large extent at least, a matter of glass quality.

Table III

| | % Transmission | | | |
|---|---|---|---|---|
| Wavelength | 1 | 2 | 3 | 6 |
| 2 $\mu$ | 20 | 38 | 58 | 19 |
| 4 $\mu$ | 21 | 39 | 57 | 15 |
| 6 $\mu$ | 22 | 39 | 56 | 14 |
| 8 $\mu$ | 13 | 23 | 24 | 4 |

FIG. 8 shows a full transmission curve (C) beyond a wavelength of 2 microns as measured for the glass of Example 3. This curve is typical of glasses of this invention. For comparison, the corresponding transmission curve (A) for a current commercial infrared transmitting glass, Code 9753 sold by Corning Glass Works, is included. It may be noted that the transmission values of curve C at shorter wavelengths are, due to glass quality, lower than might be expected. The significant factor is the substantial transmission at wavelengths between 5 and 9 microns.

Numerous other property measurements were also made on the glass of Example 3, and are as follows:

| | |
|---|---|
| Coef. of Exp. (25-300°C.) (/°C.) | 121.4 ×10⁻⁷ |
| Annealing Point (°C.) | 322 |
| Strain Point (°C.) | 289 |
| Density (g/cc.) | 7.905 |
| Dielectric Constant (25°C.) | |
| 100 cycles | 28.2 |
| 100 kilocycles | 27.7 |
| Loss Tangent (25°C.) | |
| 100 cycles | 0.0040 |
| 100 kilocycles | 0.0034 |
| Log Resistivity (250°C.) | 7.8 |
| (350°C.) | 6.1 |

As indicated earlier, optimum properties are usually obtained in the simple, four component glasses, as exemplified above. However, various other compatible oxides can be added for secondary purposes. Table IV sets forth, in both cation and weight percent, some examples of such modified compositions, together with properties measured on glasses melted on the basis of these compositions. Exp. indicates thermal coefficient of expansion × $10^{-7/°C.}$ between 25° and 300°C., while S.P. indicates strain point in °C.

Table IV

| | Cation % | | | | |
|---|---|---|---|---|---|
| | 7 | 8 | 9 | 10 | 11 |
| $Bi_2O_3$ | 36.9 | 34.9 | 30.0 | 20.0 | 30.1 |
| PbO | 29.7 | 50.9 | 30.0 | 40.0 | 40.2 |
| CdO | 9.4 | 4.2 | 10.0 | 15.0 | 10.0 |
| $Fe_2O_3$ | 13.6 | 6.0 | 20.0 | 20.0 | 15.0 |
| ZnO | 5.2 | 2.3 | 5.0 | — | — |
| BaO | 5.1 | 2.3 | 5.0 | — | — |
| $V_2O_5$ | — | — | — | 5.0 | — |
| CoO | — | — | — | — | 4.7 |
| Exp. | 133 | 122 | 113 | — | — |
| A.P. | 305 | 321 | 320 | 350 | 310 |
| S.P. | 290 | 304 | 287 | — | — |
| C.T. | — | — | — | 410 | 600 |
| M.P. | — | — | — | 360 | 615 |
| | Weight % | | | | |
| | 7 | 8 | 9 | 10 | 11 |
| $Bi_2O_3$ | 45.9 | 38.9 | 39.4 | 26.5 | 37.2 |
| PbO | 35.4 | 53.6 | 37.7 | 50.8 | 47.6 |
| CdO | 6.4 | 2.6 | 7.3 | 11.0 | 6.8 |
| $Fe_2O_3$ | 5.8 | 2.3 | 9.0 | 9.1 | 6.4 |
| ZnO | 2.3 | 0.9 | 2.3 | — | — |
| BaO | 4.2 | 1.7 | 4.3 | — | — |
| $V_2O_5$ | — | — | — | 2.6 | — |
| CoO | — | — | — | — | 2.0 |

We claim:

1. An infrared transmitting glass consisting essentially of, in cation percent on an oxide basis, 8 to 80% $Bi_2O_3$, 0 to 57% PbO, 0 to 32% CdO, at least 5% PbO + CdO and 5 to 32.5% $Fe_2O_3$.

2. An infrared transmitting glass in accordance with claim 1 and consisting essentially of 30 to 80% $Bi_2O_3$, 7 to 50% PbO and 10 to 25% $Fe_2O_3$.

3. An infrared transmitting glass in accordance with claim 1 and consisting essentially of 45 to 75% $Bi_2O_3$, 5 to 32% CdO and 12 to 30% $Fe_2O_3$.

4. An infrared transmitting glass in accordance with claim 1 in which the composition additionally contains up to 15% of at least one other compatible glassmaking constituent.

5. An infrared transmitting glass in accordance with claim 4 wherein an additional constituent is ZnO and/or BaO in a total amount not exceeding 7.5%.

6. An infrared transmitting glass in accordance with claim 4 wherein an additional constituent is up to 5% of at least one transition metal oxide.

7. An infrared transmitting glass in accordance with claim 4 wherein the total content of $SiO_2$ and $B_2O_3$, if any, does not exceed 2%.

8. A method of stabilizing a lead or cadmium bismuthate glass by including in the batch from which the glass is melted a compound of iron in an amount providing 5 to 32.5 cation percent $Fe_2O_3$ in the melt.

* * * * *

UNITED STATES PATENT OFFICE
CERTIFICATE OF CORRECTION

Patent No. 3,837,868　　　　　　Dated September 24, 1974

Inventor(s) Albert J. Berleue and William H. Dumbaugh, Jr.

It is certified that error appears in the above-identified patent and that said Letters Patent are hereby corrected as shown below:

Abstract, line 4, "Pbo + CdO" should be -- PbO + CdO --.

Column 1, line 37, "extend" should be -- extent --.

Column 2, line 54, "responsive" should be -- responsible --.

Column 3, line 22, "made" should be -- added --.

Column 6, line 44, "X $10^{-7}$/°C." should be -- x $10^{-7}$/°C. --.

Signed and sealed this 26th day of November 1974.

(SEAL)
Attest:

McCOY M. GIBSON JR.　　　　　　C. MARSHALL DANN
Attesting Officer　　　　　　　Commissioner of Patents